United States Patent [19]

Slavik

[11] Patent Number: 4,499,385

[45] Date of Patent: Feb. 12, 1985

[54] RECREATIONAL VEHICLE POWER CONTROL SYSTEM

[75] Inventor: William H. Slavik, Palos Hills, Ill.

[73] Assignee: Nuvatec, Inc., Downer's Grove, Ill.

[21] Appl. No.: 515,350

[22] Filed: Jul. 19, 1983

[51] Int. Cl.³ .............................................. H02J 3/14
[52] U.S. Cl. .................................. 307/10 R; 307/35; 307/39; 307/140
[58] Field of Search .................. 307/10 R, 34, 35, 38, 307/39, 41, 126, 130, 131, 140, 141

[56] References Cited

U.S. PATENT DOCUMENTS

| | | | |
|---|---|---|---|
| 3,603,806 | 9/1971 | Hitzke | 307/126 |
| 4,090,088 | 5/1978 | McMahon et al. | 307/38 |
| 4,336,462 | 6/1982 | Hedges et al. | 307/35 |
| 4,357,665 | 11/1982 | Korff | 307/35 X |
| 4,421,992 | 12/1983 | Hibbard et al. | 307/41 |
| 4,446,359 | 5/1984 | Arribas et al. | 307/39 X |

Primary Examiner—A. D. Pellinen
Assistant Examiner—Derek Jennings

Attorney, Agent, or Firm—Willian, Brinks, Olds, Hofer, Gilson & Lione, Ltd.

[57] ABSTRACT

A power management system for a recreational vehicle which operates automatically to disconnect a major electrical appliance, such as an air conditioner, heater or water heater, from power when the current drawn by additional appliances exceeds a preset current threshold. When the current drawn by these additional appliances falls below the threshold, the major appliance is automatically reconnected. A preferred embodiment operates to alternate between two or more air conditioners, heaters, or the like, to ensure that only one is connected to power at any given time, but that both are activated alternately and in sequence to provide efficient use of both air conditioners. In addition, preferred embodiments operate to interrupt operation of the air conditioners whenever the power voltage falls excessively low, and to ensure at least a preselected time delay between the time an air conditioner is stopped and restarted.

15 Claims, 10 Drawing Figures

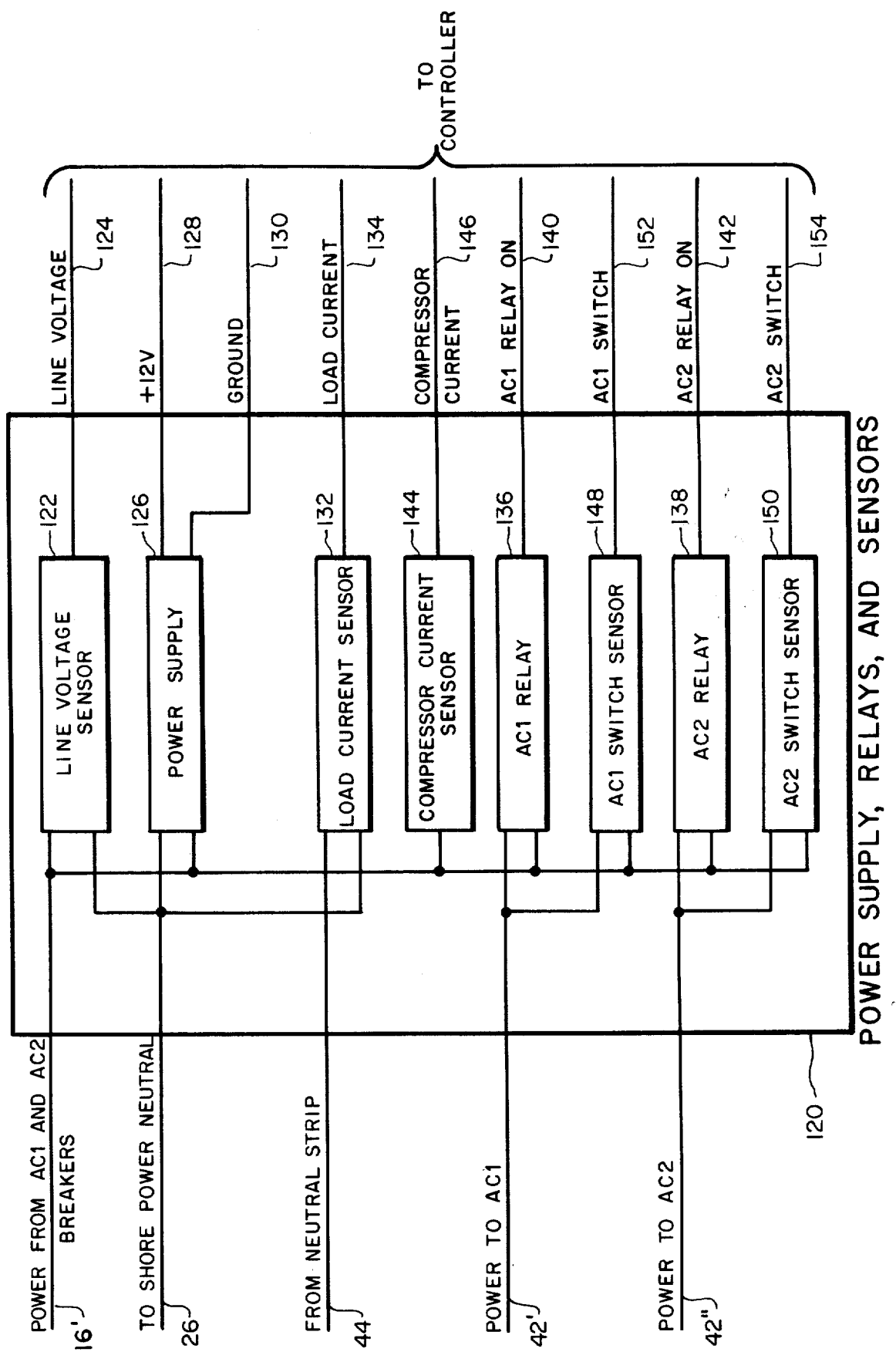

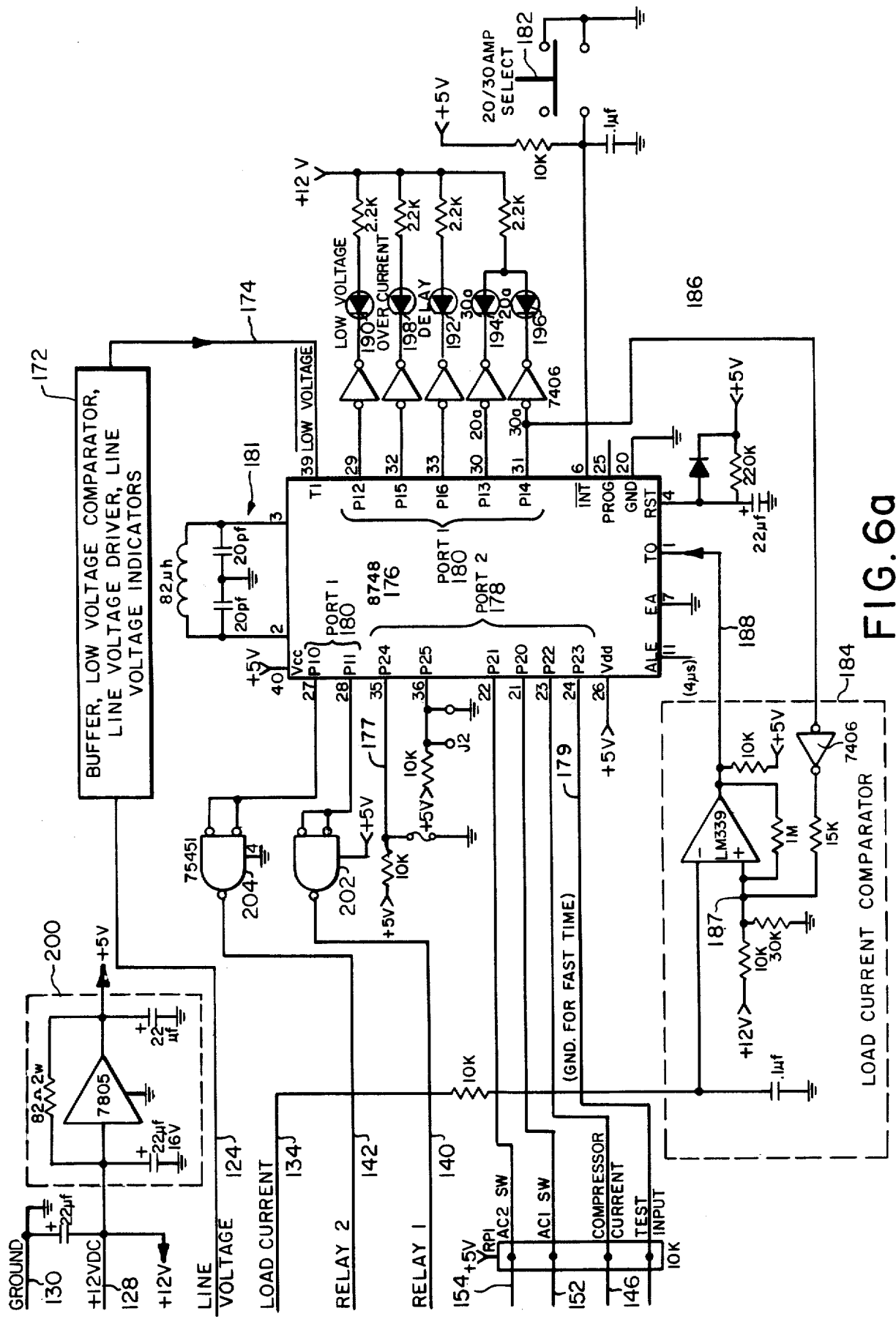

RECREATIONAL VEHICLE POWER CONTROL SYSTEM

BACKGROUND OF THE INVENTION

The present invention is directed to a control system for use in a recreational vehicle, which system provides efficient automatic control of at least one major, electrically powered appliance, such as an air conditioner or a heater.

Recreational vehicles such as motor homes and the like are characterized by a unique set of appliance control problems. When such recreational vehicles are connected to a remote source of electrical power, severe constraints are typically placed on the current that can be drawn from the remote source. As used herein, the term "shore power" will be used to designate such a remote source of electrical power for a recreational vehicle, whether land or sea based.

This current constraint can have dramatic results. for example, if a recreational vehicle is connected to a 20 amp source of electrical power, and the recreational vehicle includes a 15 amp air conditioner, the simultaneous use of a microwave oven or a hair dryer with the air conditioner may well exceed the available current capacity of the remote source, thereby causing circuit breakers to trip or fuses to blow. The replacing of blown fuses or the resetting of tripped circuit breakers can represent a considerable inconvenience to a user of a recreational vehicle in such circumstances.

Another related problem is related to the fact that a variety of recreational vehicles include two air conditioning units or two heating units. When the recreational vehicle is relying on shore power, it is generally not feasible to run both air conditioners or both heaters simultaneously because of the power limitations of the shore power connection. For this reason, it has been customary to operate a single one of the two air conditioners from shore power and to leave the other off. This approach can represent a severe inconvenience in a situation where one air conditioner cools a first portion of the recreational vehicle, and the other air conditioner cools a second portion of the recreational vehicle. If only one conditioner is allowed to run, some portion of the recreational vehicle may not be cooled adequately. Furthermore, the approach of manually activating both of the air conditioners or heaters in alternating sequence requires considerable attention by the user.

SUMMARY OF THE INVENTION

The present invention is directed to a control system for recreational vehicles which to a large extent overcomes these and other problems associated with the use of electrical appliances powered by shore power.

According to a first feature of this invention, a power control system is provided for a recreational vehicle of a type which includes means for receiving electrical current from a source of power, a major electrically powered appliance such as an air conditioner or a heater, a plurality of additional electrically powered appliances, and means for connecting the major and the additional appliances to the receiving means. According to this invention, means are provided for sensing the current drawn by the additional appliances from the receiving means, and means are provided for automatically disconnecting the major appliance from the receiving means when the sensed current exceeds a threshold signal. Furthermore, means are provided for automatically reconnecting the major appliance to the receiving means at a selected time after the sensed signal falls below the threshold level. Preferred embodiments of the invention also include means for automatically disconnecting the major appliance from the receiving means if the power voltage falls below a given threshold, as well as means for ensuring that the major appliance remains disconnected from the receiving means for a predetermined time period before it is reconnected.

These features of the invention provide important advantages in terms of convenience to the user and protection to the major appliance. By automatically disconnecting the major appliance when the current to the additional appliances exceeds a given threshold, the controller of this invention prevents the current drawn from the power source from exceeding the operative limit. In this way, the tripping of circuit breakers or blowing of fuses is avoided. Furthermore, by automatically disconnecting the major appliance when voltage levels fall below acceptable thresholds, damage to the major appliance can be avoided. Finally, by ensuring that the major appliance is not stopped and then restarted until a preselected delay time has elapsed, this controller protects appliances such as air conditioners from being forced to restart against an excessive head of pressure.

According to a second feature of this invention, a controller is provided for a recreational vehicle of the type which includes means for receiving electrical current from a source of power, a first electrically powered heat transfer appliance controlled by a first manual switch, a second electrically powered heat transfer appliance controlled by a second manual switch, a plurality of additional electrically powered appliances, and means for connecting the first and second heat transfer appliances and the additional appliances to the receiving means. According to this aspect of the invention, the control system is provided with first and second controller switches for selectively disconnecting the first and second heat tranfer devices, respectively, from the receiving means. In addition, means are provided for remotely sensing when the first and second manual switches are closed and for generating first and second switch closure signals in response thereto. A controller is provided which is responsive to the first and second switch closure signals and is coupled to control the first and second controller switches. Means are provided in the controller for automatically cycling between closure of the first controller switch and closure of the second controller switch when both the first and second switch closure signals are present, thereby ensuring that the first and second heat transfer appliances are not simultaneously connected to the receiving means. In addition, means are included in the controller for automatically closing one of the two controller switches when the corresponding one of the switch closure signals is present and the other of the switch closure signals is absent. Preferably, this second feature of the invention is used in conjunction with the first feature of the invention to automatically interrupt operation of both heat transfer appliances in the event the current drawn by the additional appliances exceeds the predetermined threshold.

This second feature of the invention can be used, for example, with heat transfer appliances such as air conditioners or heaters included in the recreational vehicle. It provides the important advantage of automatic cycling between two or more appliances in situations where it is impossible to run both appliances from a single source of power, but it is desirable that both should be operated on an intermittent basis. For example, where the first heat transfer plant is an air conditioner coupled to the rear of a recreational vehicle and the second heat transfer appliance is an air conditioner coupled to the front of the recreational vehicle, this second feature of the invention allows the entire recreational vehicle to be cooled using shore power by alternately activating the two air conditioners. In this way, the entire recreational vehicle is cooled without exceeding the current supply limits of the shore power system.

The invention itself, together with further objects and attendant advantages, will best be understood by reference to the following detailed description, taken in conjunction with the accompanying drawings.

BRIEF DESCRIPTION OF THE DRAWINGS

FIG. 5 is a more detailed block diagram of the component 120 of FIG. 4.

FIG. 6a is a detailed schematic diagram of the controller of FIG. 6.

DETAILED DESCRIPTION OF THE PRESENTLY PREFERRED EMBODIMENTS

Turning now to the drawings, FIGS. 1-3a illustrate a first preferred embodiment 10 and FIGS. 4-6a illustrate a second preferred embodiment of this invention.

THE FIRST PREFERRED EMBODIMENT

Figure 1:
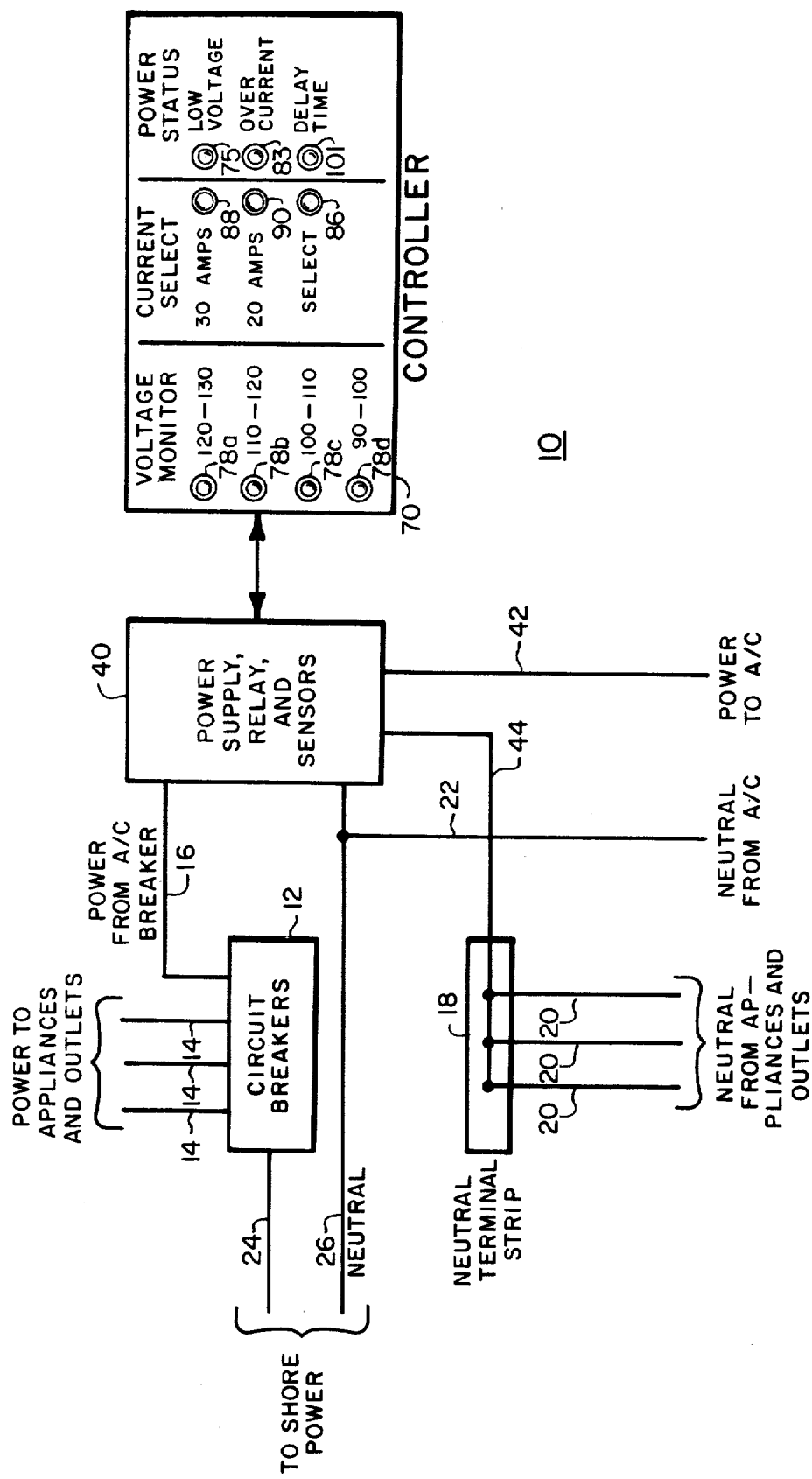
FIG. 1 is a block diagram of a control system which incorporates a first preferred embodiment of this invention.

As shown in FIG. 1, the first preferred embodiment 10 is adapted for use with a recreational vehicle which includes a single air conditioner. The recreational vehicle includes a receiving means 12 such as a circuit breaker assembly for receiving shore power via lines 24,26. The circuit breaker assembly 12 includes a plurality of circuit breakers and a number of discrete power lines emerge from the circuit breaker assembly 12. The power line 16 from the circuit breaker 12 carries power intended for the air conditioner of the recreational vehicle, and the power lines 14 carry power to additional appliances and outlets included in the recreational vehicle. Thus, for example, appliances such as ovens, microwave ovens, lamps, hair dryers and the like of the recreational vehicle would be powered by current flowing through the power lines 14. The recreational vehicle also includes a neutral terminal strip 18 which serves to terminate a plurality of discrete neutral conductors 20 coming from appliances and outlets served by the power lines 14. Line 22 serves as a neutral line to connect the air conditioner to the neutral conductor 26 which is secured to shore power.

The portions of the embodiment of FIG. 1 described above are conventional components of standard recreational vehicle electrical systems. They form no part of the invention, per se, and will not therefore be described in greater detail here.

Figure 2:
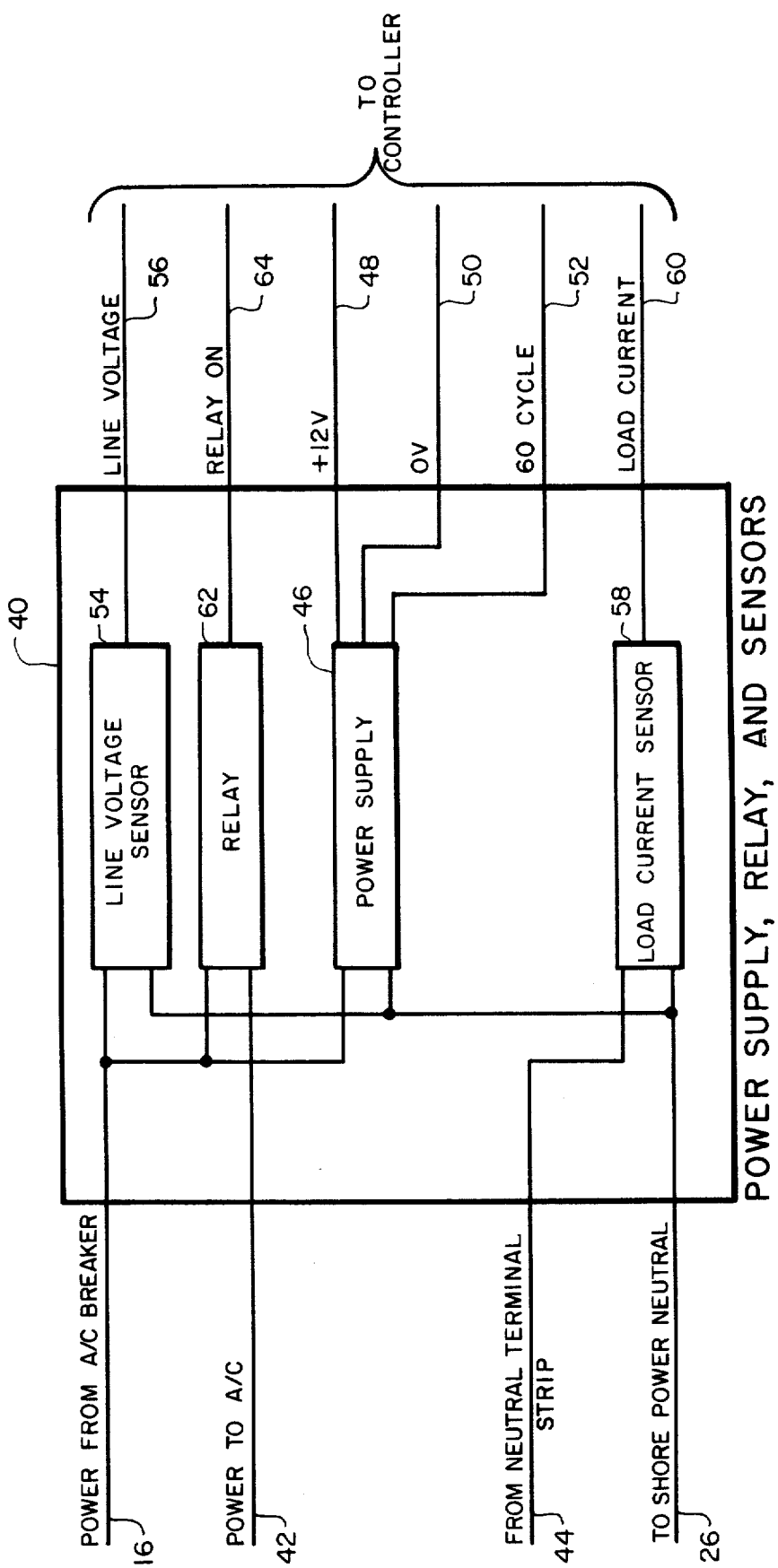
FIG. 2 is a block diagram of the component 40 of the embodiment of FIG. 1.
Figure 2A:
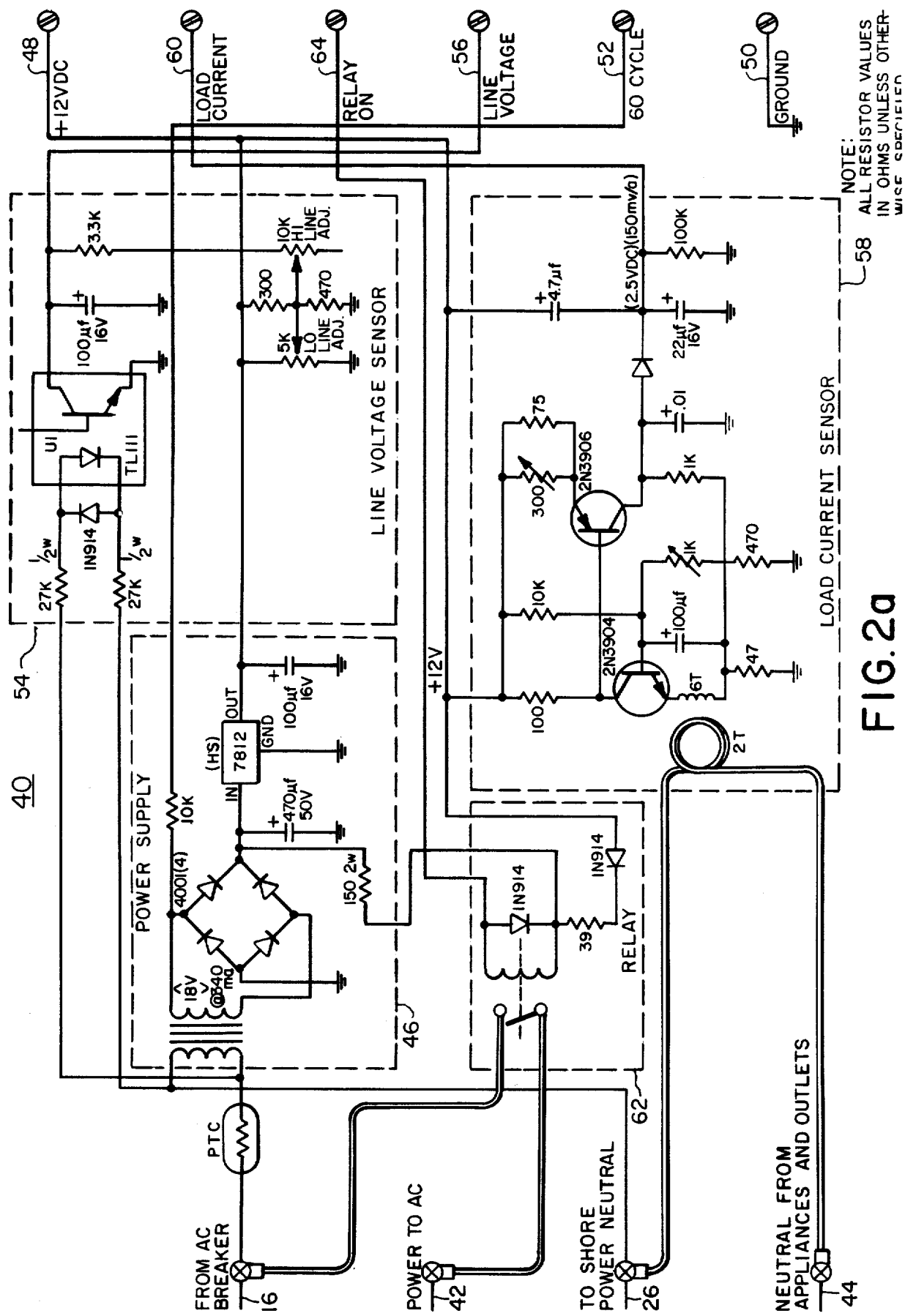
FIG. 2a is a detailed schematic diagram of the component of FIG. 2.
Figure 3:
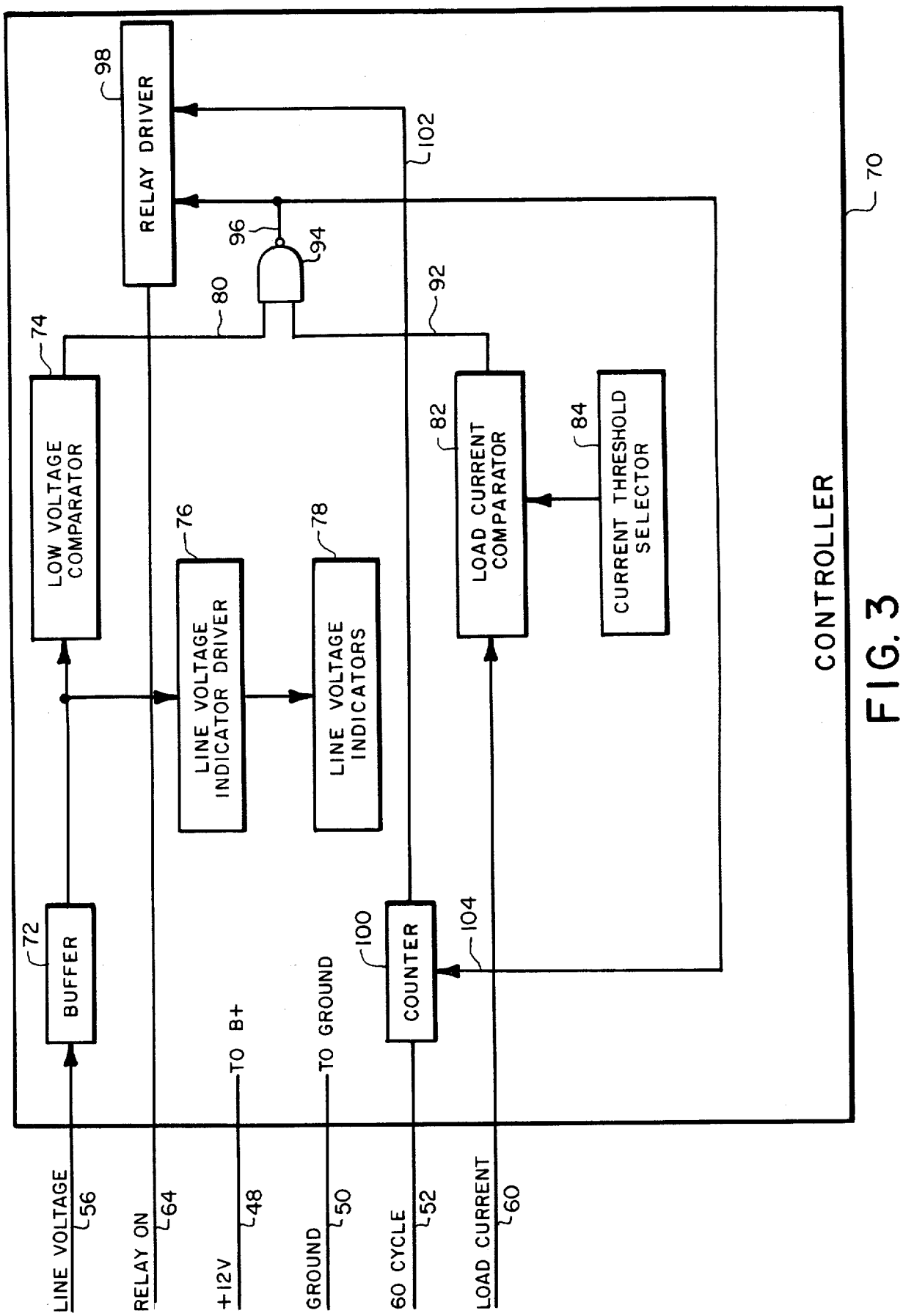
FIG. 3 is a block diagram of the controller 70 of FIG. 1.
Figure 3A:
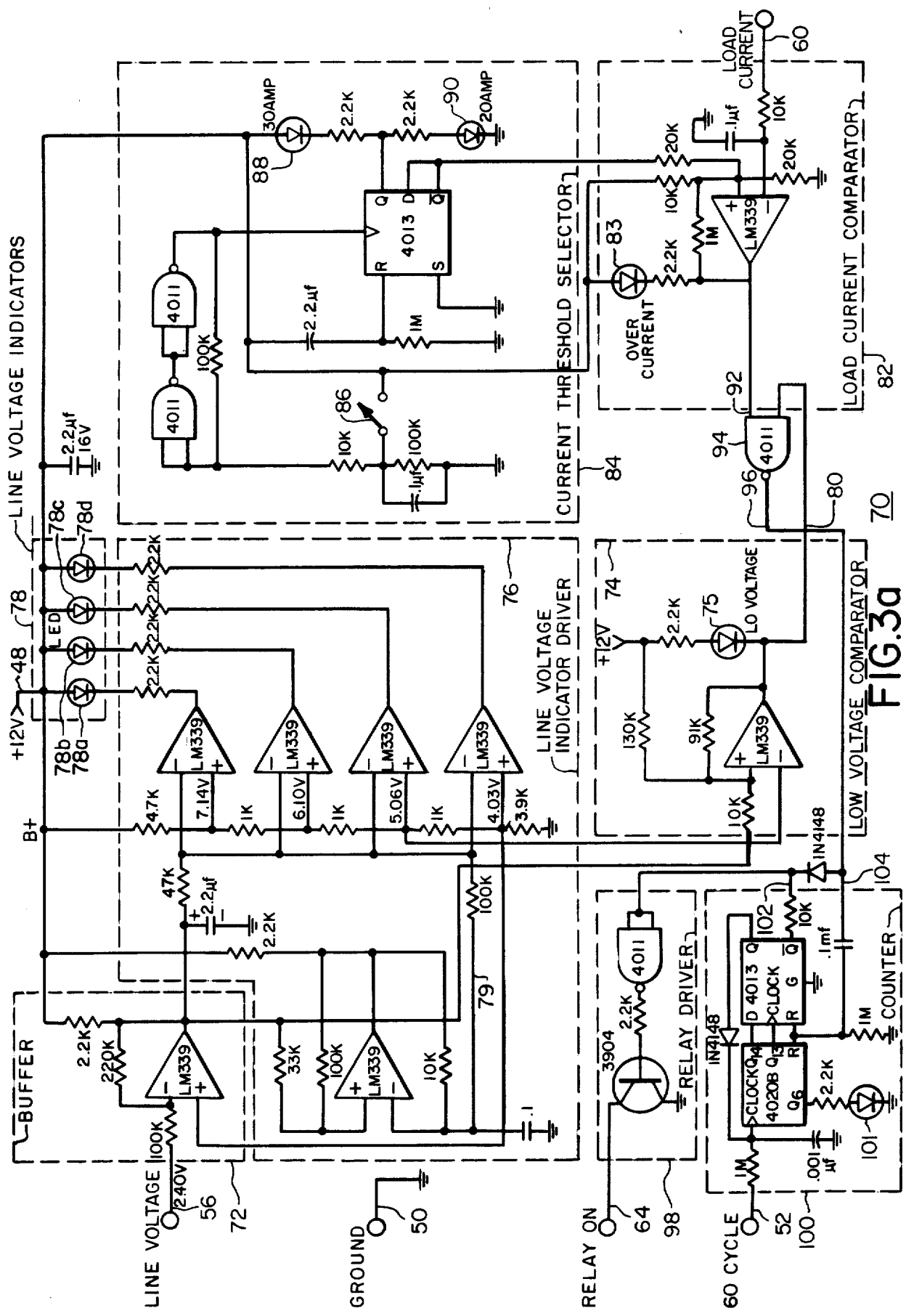
FIG. 3a is a detailed schematic diagram of the controller of FIG. 3.

According to this invention, the embodiment 10 of FIG. 1 includes a power supply, relay, and sensor circuit 40 which is coupled to a controller 70. FIGS. 2 and 2a provide a block diagram and a schematic diagram, respectively, of the power supply, relay and sensor circuit 40, and FIGS. 3 and 3a provide a block diagram and schematic diagram, respectively, of the controller 70 of FIG. 1.

Turning now to FIGS. 2 and 2a, the circuit 40 receives power from the air conditioner breaker via line 16, and is coupled to the neutral line of the shore power source via line 26. In addition, the circuit 40 is coupled by line 22 to the air conditioner and by line 44 to the neutral terminal strip 18.

As shown in FIG. 2, the circuit 40 includes four major systems within it. The first of these is the power supply 46. The power supply 46 is connected between lines 16 and 26 and operates to generate a 12 VDC signal on line 48, a ground signal on line 50, and a 60-cycle AC signal on line 52. As will be explained in detail below, these three lines 48,50,52 are connected to the controller 70.

The circuit 40 also includes a line voltage sensor 54 which develops a line voltage signal on line 56. The voltage on line 56 varies in a predetermined manner according to the voltage of the shore power source as reflected in the AC signal appearing between lines 26 and 16. In this preferred embodiment, the line voltage sensor 54 is adjusted such that the voltage on line 56 varies with the shore power voltage in the manner shown in Table 1.

TABLE 1

| Shore Power Voltage | Voltage on Line 56 |
|---|---|
| 90 VAC | 4.3 VDC |
| 95 VAC | 4.03 VDC |
| 125 VAC | 3.50 VDC |
| 130 VAC | 2.40 VDC |

The circuit 40 also includes a load current sensor 58 which is coupled between the lines 44 and 26 in order to measure the magnitude of the current flowing between the additional appliances via lines 20 and shore power via line 26. The load current sensor 58 operates to develop a signal on line 60 having a voltage indicative of the current flowing between lines 26 and 44 in accordance with the relationship outlined in Table 2.

TABLE 2

| Current | Voltage on Line 60 |
|---|---|
| 0 | 5.00 VDC |
| 6 amps | 6.00 VDC |
| 16 amps | 9.00 VDC |

As shown in FIG. 2a, the load current sensor 58 operates to provide a direct connection between the conductors 26 and 44. This direct connection provides a two-turn primary winding which cooperates with a six-turn secondary winding included in the load current sensor 58. For purposes of economy of fabrication, it has been found preferable in this embodiment to form the six-turn secondary coil via printed circuit conductors, and to wrap the two-turn primary coil around a simple metallic cable clamp which is passed through an appropriately situated opening in the circuit board which carries the conductors for the secondary coil.

The fourth major component of the circuit 40 is a relay 62 which is coupled to interconnect and disconnect lines 16 and 42. The state of the relay 62 is determined by a signal appearing on line 64. Thus, when the relay 62 is closed, power is allowed to flow from the air conditioner breaker via line 16 directly to the air conditioner via line 42. Conversely, when the relay 62 is open, the air conditioner is disconnected from the air conditioner breaker and therefore from the source of shore power.

Turning now to FIGS. 3 and 3a, the signals on lines 48, 50, 52, 56, 60 and 64 pass between the circuit 40 and the controller 70. The controller 70 acts to buffer the line voltage signal on line 56 via buffer 72 and to apply this buffered signal to a low voltage comparator 74. The low voltage comparator 74 compares the line voltage signal with a preset threshold value and generates a signal on line 80 when the line voltage signal falls below this threshold level. An LED 75 is illuminated whenever a signal is generated on line 80. In this preferred embodiment, the low voltage comparator 74 acts to generate the signal on line 80 when the voltage of the shore power falls below 95 VAC, and to maintain the signal on line 80 until the shore power voltage rises above 105 VAC.

The buffered line voltage signal is also applied to a line voltage indicator driver 76 which serves to control four line voltage indicators 78. These line voltage indicators 78 are individually identified by reference numerals 78a, 78b, 78c and 78d in FIG. 1. As shown in FIG. 3a, the line voltage indicator driver 76 includes means for generating a sawtooth signal on line 79 having an amplitude which varies with the line voltage signal on line 56. This sawtooth signal is applied to four comparators, each of which is supplied with a differing reference voltage. Each comparator serves to drive a respective one of the four indicator LEDs 78a,b,c,d.

In this preferred embodiment, the indicator 78a is illuminated when the shore power voltage is in the range of 120-130 VAC, the indicator 78b is illuminated when the shore power voltage is in the range of 110-120 VAC, the indicator 78c is illuminated when the shore power voltage is in the range 100-110 VAC, and the indicator 78d is illuminated when the shore power voltage is in the range 90-100 VAC. Because of the manner in which a sawtooth wave is used as an input for the comparators, within any given range, the duty cycle of the respective indicator 78, and therefore the perceived brightness of the indicator 78, varies within the range. This allows the user to estimate the actual shore power voltage to within a few volts.

The controller 70 also includes a load current comparator 82. This load current comparator 82 receives the load current signal via line 60 as well as threshold signals from a current threshold selector 84. This current threshold selector 84 includes a switch 86 which is manually operated by a user so as to cause the threshold generated by the threshold selector 84 to be switchable between a threshold suitable for a 20 amp shore power source, and a threshold suitable for a 30 amp shore power source.

The current threshold selector 84 automatically switches to a threshold suitable for a 20 amp shore power source on initial application of power to the system. In this case the LED 90 is illuminated. If the user desires to alter the current threshold to one appropriate for a 30 amp shore power source, he merely activates the switch 86 to cause the threshold signal generated by the threshold selector 84 to assume a value appropriate to a 30 amp shore power supply. In this case, the LED 88 is automatically illuminated. In this preferred embodiment, the threshold signal supplied by the current threshold selector is 6 VDC for a 20 amp and 9 VDC for a 30 amp shore power source.

The load current comparator 82 operates to compare the load current signal on line 60 with the threshold generated by the current threshold selector 84. In the event the load current signal on line 60 exceeds this threshold, the load current comparator 82 generates a signal on line 92 until the load current signal falls below the threshold. When generated, this signal is indicative of an over current condition, and the LED 83 is illuminated whenever the over current signal is generated on line 92.

The logical signals on line 80 from the low voltage comparator and line 92 from the load current comparator are applied as inputs to a NAND gate 94. Whenever either the low voltage comparator 74 indicates a low voltage condition via line 80 or the load current comparator 82 indicates an over current condition via line 92, the gate 94 generates a signal on line 96 which causes a relay driver 98 to open the relay 62, thereby disconnecting the air conditioner from the source of shore power.

The controller 70 also includes a counter 100 which counts the cycles of the 60-cycle signal on line 52 and operates to prevent the relay driver 98 from closing the relay 62 until a predetermined period has elapsed since the counter 100 was last reset. In this preferred embodiment, that predetermined period is about 3½ minutes. The counter 100 includes an LED 101 which is illuminated in a blinking fashion whenever the counter is operating to prevent the relay driver 98 from closing the relay 62. In this preferred embodiment, the counter 100 is automatically reset when power is applied to the system. In addition, the counter is reset via line 104 when the gate 94 operates to cause the relay driver 98 to open the relay 62. Thus, the counter 100 will prevent the relay driver 98 from closing the relay 62 until about 3½ minutes have elapsed since the relay driver 98 opened the relay 62.

Having described the structure of this first preferred embodiment, its operation can now be discussed in detail. In general terms, the circuit 40 and the controller 70 cooperate so as to connect and disconnect the air conditioner from the shore power automatically, depending on three separate sets of criteria.

First, the air conditioner is automatically disconnected from shore power whenever the current drawn by the additional appliances via the conductors 14 exceeds a predetermined threshold which can be set as appropriate for either a 20 or 30 amp shore power source. For example, when the switch 86 is used to select a threshold suitable for a 30 amp shore power source, the current threshold is set at 16 amps. Whenever the combined current flowing to all appliances and outlets in the recreational vehicle other than the air conditioner exceeds 16 amps, then the air conditioner is automatically disconnected from shore power. The 16 amp threshold was chosen as suitable for 30 amp shore power source because many air conditioners draw approximately 14 amps.

Thus, if the air conditioner were running and the current drawn by the additional appliances in the recreational vehicle were to exceed 16 amps, a real danger would be present that the total current drawn by the recreational vehicle from the shore power would exceed the available 30 amp supply. The preferred embodiment of FIGS. 1–3a automatically disconnects the air conditioner from the shore power in order to prevent such an overcurrent condition. After the current drawn by the additional appliances via lines 14 falls below this threshold, the relay 62 is automatically closed in order to allow power to flow from shore power to the air conditioner.

It should be noted that the embodiment of FIGS. 1–3a functions without any alteration of any sort to the air conditioner, which remains under normal manual and thermostatic control. The only action taken by the embodiment 10 of this invention is simply to disconnect the air conditioner from the shore power.

A second, independent test which is performed by the embodiment 10 of this invention relates to the voltage of the shore power. As is well known, air conditioners can be damaged in the event they are operated at excessively low voltages. The line voltage sensor 54 cooperates with the low voltage comparator 74 so as automatically to open the relay 62 in the event the shore power voltage falls below 95 VAC, and to maintain the relay 62 open until the shore power voltage exceeds 105 VAC. In this way, the air conditioner is protected from low voltage conditions.

The third, independent control provided by the embodiment 10 relates to the period of time the air conditioner is disconnected from shore power. The counter 100 operates to ensure that on initial power application to the system, the air conditioner is disconnected from shore power for a period of about 3½ minutes. In addition, whenever the relay 62 is opened, either because of a low voltage condition or an overcurrent condition, the counter 100 ensures that the relay 62 remains open for at least about 3½ minutes. In this way, the air conditioner is never restarted immediately after it has been stopped. This delay allows excessive head pressures in the air conditioner to bleed off before restarting is attempted.

Thus, the embodiment 10 of this invention operates automatically to protect the air conditioner from premature restart attempts and from low voltage conditions. In addition, the embodiment 10 operates to shed the air conditioner load whenever an overcurrent condition is threatened. The blowing of fuses or tripping of circuit breakers associated with an over current condition is thereby substantially reduced. When the over current condition disappears, the embodiment 10 operates automatically to restore power to the air conditioning. In the following claims, the term "major appliance" is used to refer to easily sheddable appliances which draw relatively large electrical currents, such as air conditioners in the above example, heaters, water heaters, or the like.

THE SECOND PREFERRED EMBODIMENT

Figure 4:
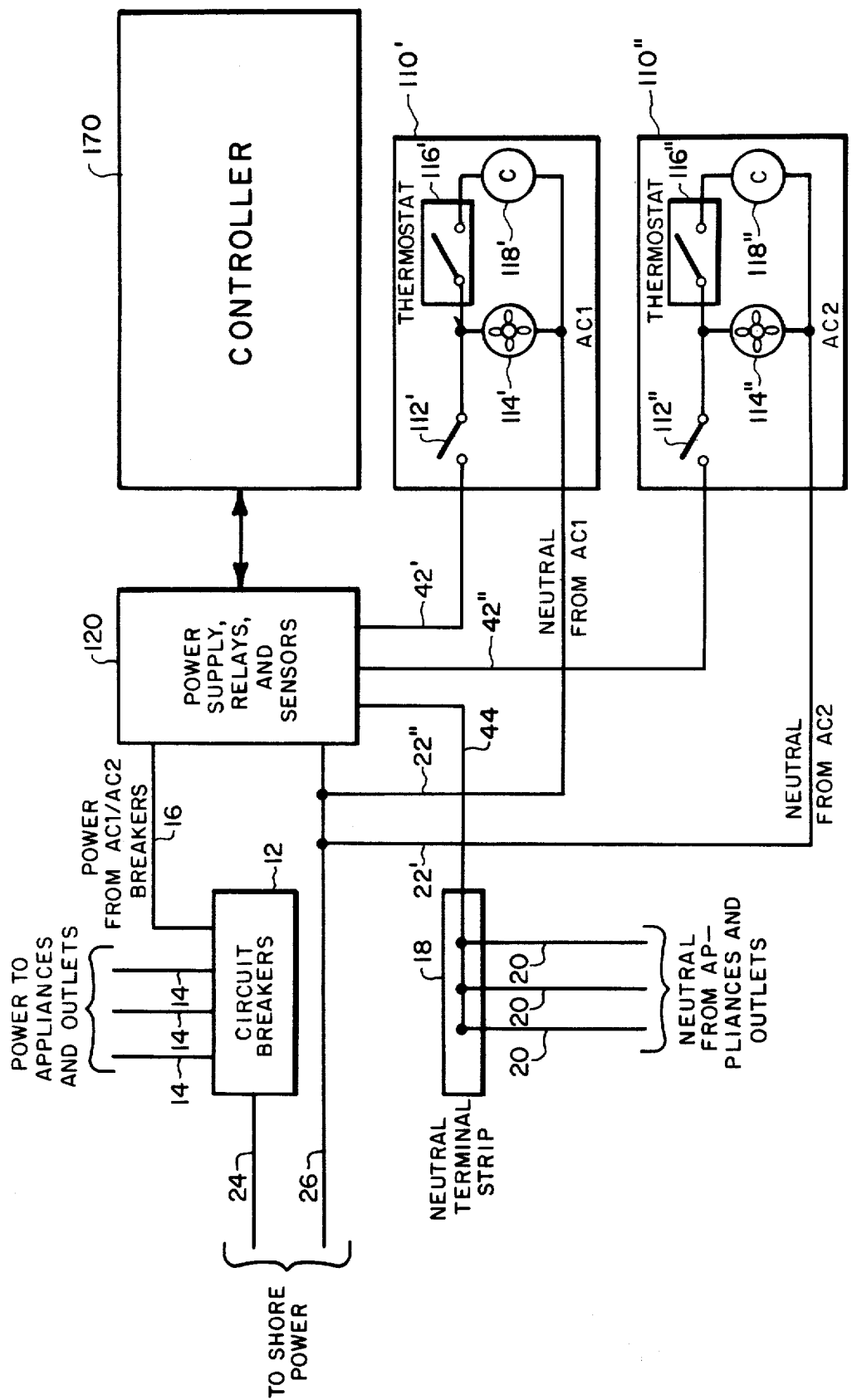
FIG. 4 is a block diagram of a control system which incorporates a second preferred embodiment of this invention.

Turning now to FIGS. 4–6a, a second preferred embodiment of this invention is there illustrated. As shown in FIG. 4, this second preferred embodiment is similar in many ways to the first preferred embodiment described above. Where appropriate, identical reference numerals have been used in FIGS. 4 and 1, and these elements will not be described in further detail here.

It should be noted that the recreational vehicle air conditioning system shown in FIG. 4 includes two air conditioners 110', 110". Each air conditioner includes a respective manual switch 112',112" which is controlled by the user to activate or deactivate the respective air conditioner. Each air conditioner includes a respective fan unit 114',114", and the fan units 114',114" are activated whenever the respective manual switches 112',112" are closed. In addition, each of the air conditioners includes an air conditioner compressor 118',118", the cycling of which is controlled by an adjustable thermostatic switch 116',116". Such air conditioners 110',110" are well known to those skilled in the art and will not be described in greater detail here. For example, the first air conditioner 110' can be situated at the rear of a recreational vehicle, such as a motor coach, and the second air conditioner 110" can be situated at the front of such a recreational vehicle.

As shown in FIG. 4, the power supply, relays, and sensors circuit 120 is interconnected between the line 16', which carries power from the air conditioner breakers, and the lines 42',42", which carry power to the respective air conditioners 110',110". FIGS. 5–6a show in block diagram and schematic form, respectively, the details of the circuit 120 and the controller 170.

Figure 5A:
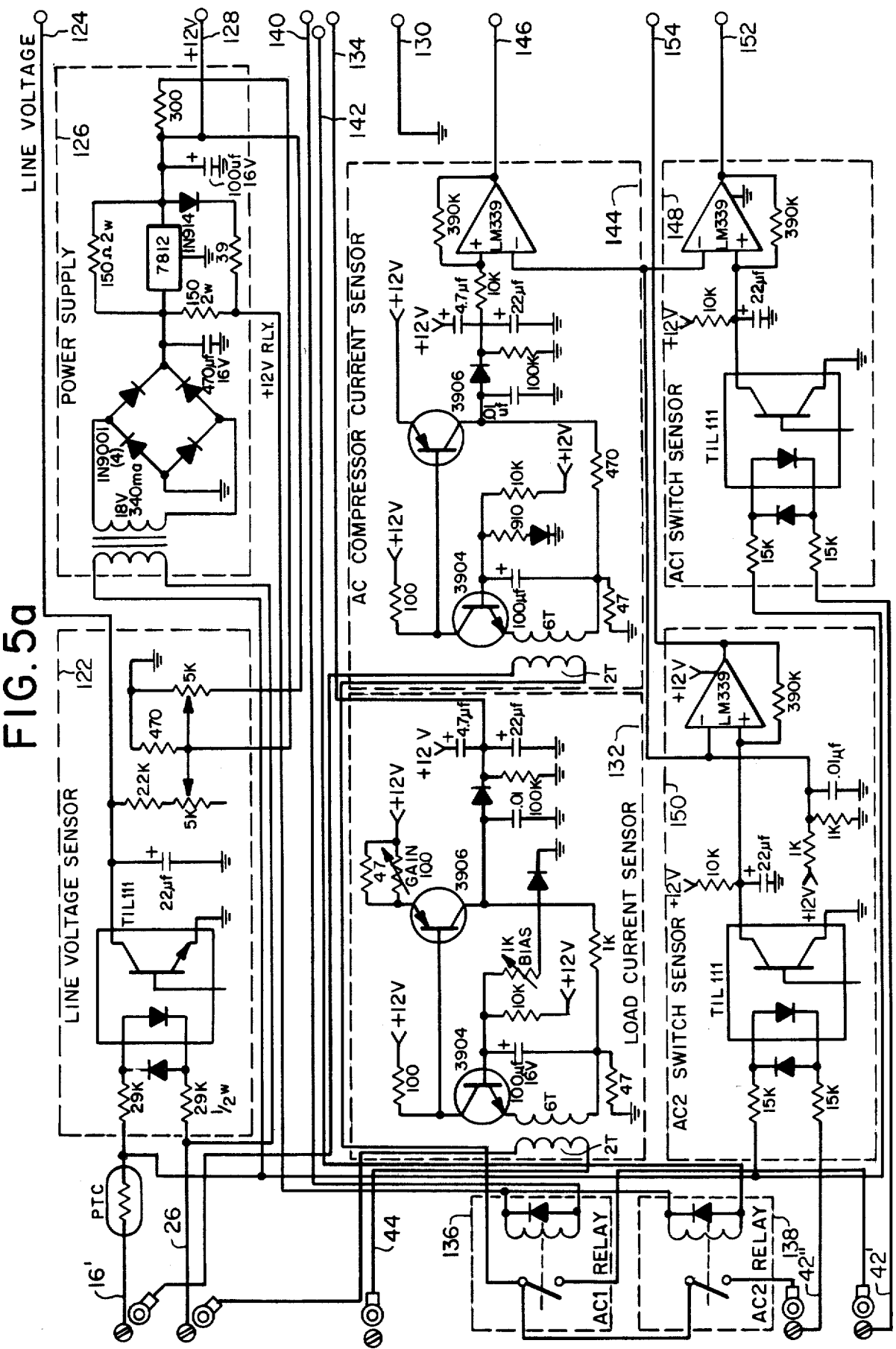
FIG. 5a is a detailed schematic diagram of the component of FIG. 5.
Figure 6:
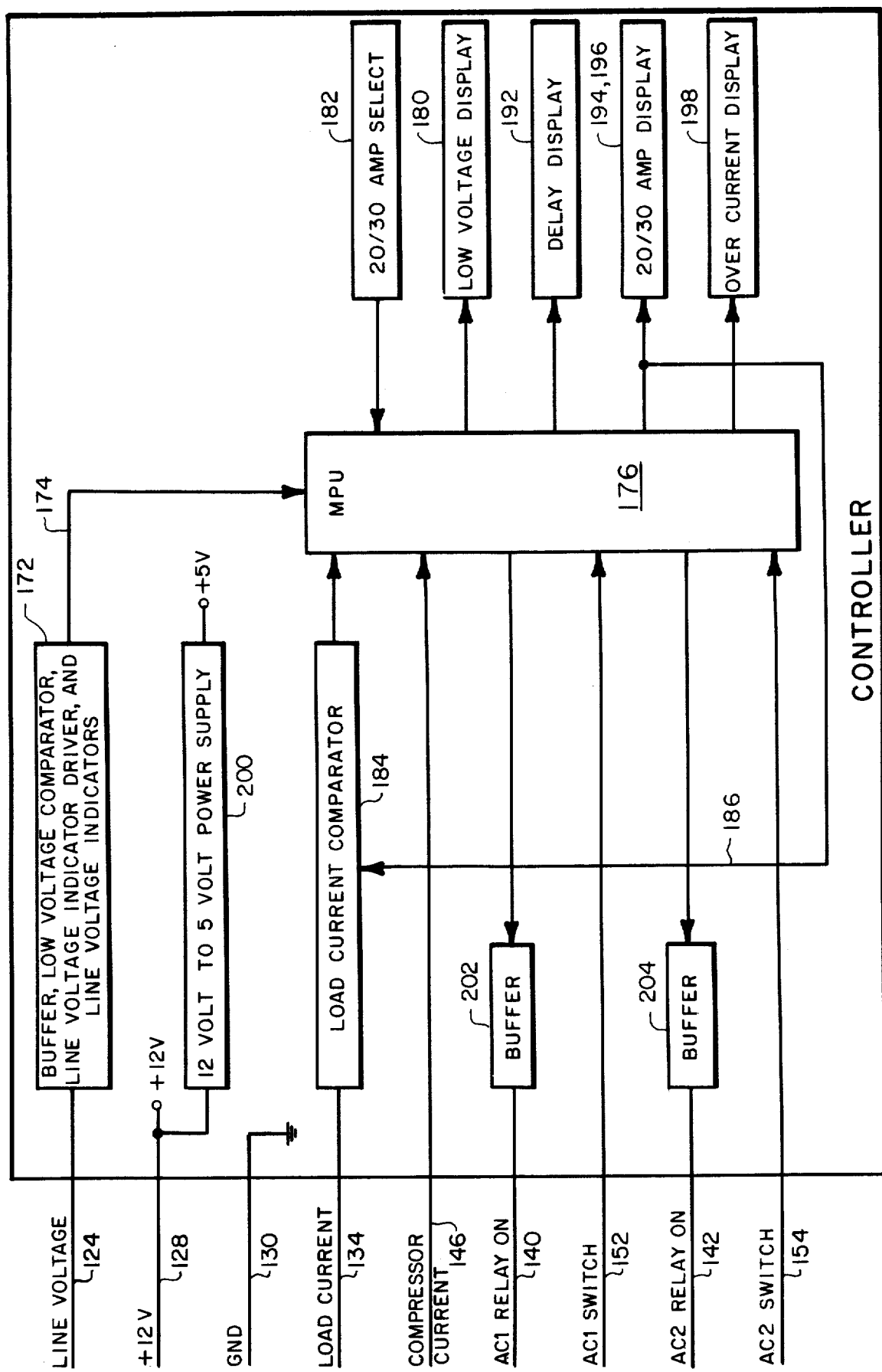
FIG. 6 is a more detailed block diagram of the controller 170 of FIG. 4.

Turning now to FIGS. 5 and 5a, the circuit 120 includes a line voltage sensor 122 which develops a line voltage signal on line 124. In addition, it includes a power supply 126 which develops 12 VDC and ground voltages on lines 128,130. A load current sensor 132 is also included which develops a DC voltage on line 134 which is proportional to the electrical current drawn by additional appliances in the recreational vehicle and routed via the conductors 20 to the neutral terminal strip 18. Each of the components 122,126,132 corresponds directly with a corresponding component in the first preferred embodiment described in detail above. For this reason, these components of the second preferred embodiment will not be described in greater detail here.

The circuit 120 also includes first and second relays 136,138, each of which is controlled by a digital signal on a respective input line 140,142. The first relay 136 operates selectively to connect and disconnect line 42' from line 16'. In this way, the relay 136 can be used selectively to connect or disconnect the first air conditioner 110' from the source of shore power. In a corresponding manner, the second relay 138 operates selectively to connect and disconnect line 16' from line 42", depending upon the control signal on input line 142. Thus, the second relay 138 operates selectively to connect and disconnect the second air conditioner 110" from the source of shore power.

The circuit 120 also includes a compressor current sensor 144 which produces a digital signal on line 146 indicative of whether or not either of the two compressors 118',118" is running. As will be explained below, the controller 170 utilizes the signal on line 146 in controlling the two air conditioners 110',110".

The circuit 120 also includes first and second air conditioner switch sensors 148,150, each of which generates a digital signal on lines 152,154, respectively. The digital signals on lines 152,154 indicate whether or not the manual switches 112',112" are closed, respectively.

FIG. 5a shows a detailed electronic diagram of the circuitry of FIG. 5. This diagram is largely self-explanatory, but it should be noted that the transformer included in the power supply 126 is a 18-volt, 340 milliamp transformer, such as for example the transformer manufactured and distributed by the James Transformer Company as Model 13706. The transformers included in the load current sensor 132 and the compressor current sensor 144 both employ printed circuit secondary windings having six turns each and primary windings having two turns each. As described above in connection with the first preferred embodiment, the two turns of the primary winding can be for example wound around a metal cable clamp which passes through the circuit board on which the secondary turns are formed. The line voltage sensor 122 and the first and second switch sensors 148,150 all include isolators such as those distributed by Texas Instruments Company as Part No. TL111.

In summary, the block 120 generates two analog voltage signals on lines 124 and 134 (indicative of the shore power voltage and the current being drawn by the additional appliances of the recreational vehicle, respectively) as well as three digital signals on lines 146, 152, and 154 (indicative of whether or not either of the air conditioner compressors 118',118" is running and whether or not either of the two manual switches 112',112" is closed, respectively). In addition, the block 120 receives two control signals via lines 140,142 which operate selectively to connect and disconnect the respective air conditioners 110',110" from shore power.

Turning now to FIGS. 6 and 6a. FIG. 6 shows a block diagram of the controller 170, and FIG. 6a shows the detailed schematic diagram of the controller 170. The controller 170 as shown in FIG. 6 includes a circuit 172. This circuit 172 is identical in circuitry to the corresponding components 72,74,76,78 of the first preferred embodiment except that the low voltage indicator 75 has been removed and the resistor associated with the low voltage indicator has been replaced with a 10K resistor. The circuitry 172 generates a digital signal on line 174 indicative of a low voltage condition in the shore power, and this signal is supplied as a digital input to a microcomputer 176.

The microcomputer 176 includes an 8 bit input port 178 and an 8 bit output port 180. As shown in FIG. 6a, the microprocessor 176 receives via the input port digital signals via lines 154, 152 and 146 indicative of whether or not either of the two manual switches 112',112" is closed and whether or not either of the compressors 118',118" is operating. In addition, the microcomputer 176 receives digital input via line 177 indicative of whether a 3½ minute or a 2 minute time delay is desired. A rest signal via line 179 can be used to cause the microprocessor 176 to step through its sequence at high speed to facilitate testing. The clock 181 for the microcomputer 176 is preferably designed to oscillate at 2.5 Megaherz. In addition, the microcomputer 176 receives a digital input signal from a switch 182 which is operated by a user to select a current threshold suitable for either 20 or 30 amp sources of shore power. The remaining input to the microcomputer 176 is provided by the load current comparator 184 via line 188.

As explained above in connection with the first preferred embodiment, the signal generated by the load current sensor on line 134 varies between 3.9 VDC for a load current of the recreational vehicle (excepting the air conditioners 110',110") of 0 amps, 6 VDC for a load current of 7 amps, and 9 VDC for a load current of 19 amps. Depending upon the voltage on line 186, the voltage at node 187 is set at either 6 VDC or 9 VDC as a current threshold signal appropriate for either a 20 amp or 30 amp shore power source, respectively. The load current comparator 184 then generates a digital signal on line 188 indicative of whether or not the load current signal on line 134 is above or below the currently prevailing threshold.

The microcomputer 176 controls a number of displays as well as the first and second relays 136,138 by means of signals on the output port 180. As shown in FIG. 6a, the computer controls a low voltage LED 190, which is illuminated whenever the relays 136,138 are opened because of a low voltage condition on the shore power. In addition, the microcomputer 176 controls a time delay LED 192, which is activated whenever the relays 136,138 are opened in order to ensure a predetermined delay between the time either of the air conditioners 110',110" is disconnected from and reconnected to shore power. LEDs 194,196 are illuminated by the microcomputer 176 to indicate whether a 30 amp current threshold or a 20 amp current threshold has been selected. When the 20 amp LED 196 is activated, the conductor 186 causes the voltage at node 187 to be placed at 6 VDC. An over current LED 198 is activated by the microcomputer 176 whenever either of the relays 136,138 is opened due to an overcurrent condition. The remaining two outputs of the microcomputer 176 are connected via the buffers 202,204 to the two relays 136,138. Thus, by placing appropriate digital signals at the inputs of the buffers 202,204, the microcomputer 176 can selectively connect and disconnect both of the air conditioners 110',110" from shore power. The program of the microcomputer 176 of this preferred embodiment is reproduced in Appendix A.

Reference numeral 200 is used to indicate a 12 VDC to 5 VDC power supply included in the controller 170.

Having described the structure of the second preferred embodiment, its operation can now be discussed in detail. In general, the second preferred embodiment operates in a similar manner to that of the first with respect to automatic overload shutdown. Thus, whenever the current drawn by the additional appliances and outlets (as sensed by the current between lines 44 and 26) exceeds a predetermined current threshold indicative of the maximum current of the source of shore power, the controller 170 operates automatically to open the relays 136,138 in order to shed the air conditioners. When the current drawn by the additional appliances returns to a safe level, the air conditioners 110',110" are then returned to normal service after a delay as explained below. When power is first applied to the controller 170, the microcomputer 176 automatically sets the current threshold at a value appropriate for a 20 amp shore power source. The user can operate the switch 182 to vary this current threshold between values suitable for 20 and 30 amp shore power sources.

Furthermore, in a manner similar to that described above, the controller 170 operates to ensure that both of the relays 136,138 remain open for at least about 3½ minutes whenever they are opened. Thus, when power is applied to the controller 170 or when either of the relays 136,138 is opened by the controller 170, a 3½ minute delay is provided before either of the relays 136,138 is closed. As explained above, this feature of the controller prevents the air conditioner from attempting to start against a high head pressure immediately following a temporary loss of power. If desired, the jumper on line 177 can be cut in order to cause the microcomputer 176 to substitute a two minute delay period for the standard 3½ minute period discussed above.

A third feature of the controller 170 similar to that of the first preferred embodiment described above is that the controller 170 operates to open the relays 136,138 thereby shutting down the air conditioners 110',110" whenever the line voltage drops below 95 VAC. In addition, the controller 170 prevents startup of either of the air conditions 110',110" if the line voltage on the shore power source is below 105 VAC.

The controller 170 also provides a flexible and advantageous control of the two air conditioners 110',110" to ensure that both air conditioners are not operated simultaneously, yet to automatically sequence between the two. In many situations where the Recreational Vehicle Industry Association rules govern, only a single air conditioner is allowed to be operated from shore power in order to minimize power requirements for camp ground facilities. In the past, owners of recreational vehicles having two air conditioners had to switch between the two manually. In order to prevent this inconvenience, the controller 170 operates to cycle between the two air conditioners 110',110" as required to maintain maximum use of each unit. It should be clearly understood that the sensing and control of the air conditioners described below is done entirely without modifying or entering either of the air conditioners 110',110", and that the embodiment of FIGS. 4-6a can therefore be installed in a particularly simple and straightforward manner.

In operation, when power is first applied, both air conditioners are held off for approximately 3½ minutes to allow any head pressure to equalize. At the end of this period, the controller 170 senses the manual on-off switch 112' of the first air conditioner 110' to determine if it is set in the on position. Assuming it is in the on position, the controller 170 closes the relay 136 to apply power to the first air conditioner 110'. Current drawn by the compressor 118' will then be monitored to determine if the compressor 118' is running. Assuming it is, the controller 170 will allow the first air conditioner 110' to continue to run until the thermostat 116' is satisfied and the compressor 118' is shut off by the thermostat 116'. Once the compressor 118' has been shut off, the controller 170 will allow the fan of the first air conditioner 110' to continue to run for about 3½ minutes in order to take advantage of the cool evaporator.

At this point, the controller 170 will sense the manual on-off switch 112" of the second air conditioner 110". Assuming it is in the on position, the controller 170 will shut down the first air conditioner 110' via the first relay 136 and apply power to the second air conditioner 110" via the second relay 138. As before, the controller 170 will sense current to the second air conditioner 110" and determine when the compressor 118" is turned off by the thermostat 116". The controller 170 will then disconnect the second air conditioner 110" from shore power via the relay 138 approximately 3½ minutes after the second compressor 118' has been shut down. The cycle will then resume with the first air conditioner 110'.

If either of the two air conditioners 110',110" is turned off at the manual switch 112',112", the controller 170 will allow the remaining unit to run normally, without cycling between air conditioners. If a compressor of either air conditioner 110',110" does not go on when power is supplied, the controller 170 will leave power applied for approximately 10 minutes before returning power to the other air conditioner. If the compressor comes on during this waiting period, the controller 170 will operate the air conditioner as if power were just applied.

The controller 170 ensures that both air conditioners 110',110" are never simultaneously connected to the shore power. However, if the generator set of the recreational vehicle is started, the first air conditioner 110' will automatically be connected to the generator set and the second air conditioner 110" will be operated continuously from shore power.

In the above examples, both embodiments have been shown as being connected to shore power. It should be understood that they can easily be connected to other sources of electrical power, such as a generator set on the recreational vehicle, for example. When so used, the present invention allows a reduction in the size of the generator set. Such generator sets for a recreational vehicle are normally selected to provide sufficient power reserve to handle one or more air conditioners, a microwave oven, and a few other appliances at the same time. The resulting generator set is therefore heavier, larger and costlier than that necessary when the preferred embodiments described above are utilized.

From the foregoing, it should be apparent that an improved system has been disclosed which provides important advantages. By automatically shedding a large electrical load associated with a heat transfer appliance, such as an air conditioner, a heater, a water heater, or the like, whenever the electrical current drawn by additional appliances in the recreational vehicle exceeds a current threshold, the present invention minimizes power disruptions.

Furthermore, the automatically sequencing feature of the invention described above in connection with the second preferred embodiment provides important advantages in terms of convenience when the recreational vehicle is operating from a source of shore power that allows only one of two air conditioners or heaters to be run at any given time. By automatically alternating between the two air conditioners, the entire recreational vehicle is cooled without overloading available power supplies.

Of course, it should be understood that a wide range of changes and modifications to the preferred embodiments described above will be apparent to those skilled in the art. For example, the present invention is not limited to use in disconnecting air conditioners from a source of power. Rather, any easily shedable large electrical load can be used in substitution for the air conditioner, such as the heater or water heater, for example. It is therefore intended that the foregoing detailed description be regarded as illustrative rather than limiting, and that it be understood that it is the following claims, including all equivalents, which are intended to define the scope of this invention.

I claim:

1. A power control system for a recreational vehicle comprising means for receiving electrical current from a source of power characterized by a power voltage, a major electrically powered appliance, a plurality of additional electrically powered appliances, and means for connecting the major appliance and the additional appliances to the receiving means, said power control system comprising:
- means for sensing the current drawn by the additional appliances from the receiving means;
- means for generating a current threshold signal;
- means for automatically disconnecting the major appliance from the receiving means when the second current exceeds the threshold signal; and
- means for automatically reconnecting the major appliance to the receiving means at a selected time after the sensed current falls below the threshold signal;
- said disconnecting means further comprising means for automatically disconnecting the major appliance from the receiving means when the power voltage falls below a first value; and
- said reconnecting means further comprising means for automatically reconnecting the major appliance to the receiving means after the power voltage exceeds a second value, greater than the first value.

2. The invention of claim 1 further comprising means for delaying the selected time for a predetermined time period after the sensed current falls below the threshold signal to ensure that the major appliance remains disconnected by the disconnecting means from the receiving means for at least the predetermined time period.

3. The invention of claim 1 further comprising:
- means for generating a visual display indicative of the amplitude of the power voltage.

4. The invention of claim 1 wherein the major appliance comprises a first air conditioner, wherein the recreational vehicle further comprises a second air conditioner, and wherein the invention further comprises means, included in the reconnecting means, for alternately connecting the first and second air conditioners to the receiving means to provide intermittent operation of both air conditioners while preventing both air conditioners from drawing power simultaneously.

5. A power control system for a recreational vehicle comprising means for receiving electrical current from a source of power characterized by a power voltage, a major electrically powered appliance, a plurality of additional electrically powered appliances, and means for connecting the major appliance and the additional appliances to the receiving means, said power control system comprising:
- means for sensing the current drawn by the additional appliances from the receiving means;
- means for generating a current threshold signal;
- means for automatically disconnecting the major appliance from the receiving means when the sensed current exceeds the threshold signal;
- means for automatically reconnecting the major appliance to the receiving means at a selected time after the sensed current falls below the threshold signal;
- a plurality of discrete light sources; and
- means, responsive to the power voltage, for controlling the light sources such that each of the light sources is illuminated when the power voltage is in a respective range of values, with a brightness indicative of the magnitude of the power voltage within the respective range.

6. In a recreational vehicle comprising means for receiving electrical current from a source of power characterized by a power voltage, a major electrically powered appliance, a plurality of additional electrically powered appliances, and means for electrically interconnecting the major appliance and the additional appliances to the receiving means, the improvement comprising:
- a switch, included in the interconnecting means, for disconnecting the major appliance from the receiving means;
- current sensor means for generating a current load signal indicative of the current drawn by the additional appliances from the source of power;
- switch control means, responsive to the current load signal, for automatically controlling the switch to disconnect the major appliance from the receiving means when the current load signal enters a first range of values, and for automatically controlling the switch to reconnect the major appliance to the receiving means when the current load signal enters a second range of values, said first and second ranges of values chosen such that the major appliance is automatically removed from the source of power when the current to the additional appliances exceeds a maximum value before the combined current to the major and additional appliances exceeds a predetermined value characteristic of the source of power, and the major appliance is automatically reconnected with the source of power after the current to the additional appliances falls to a point where the combined current to the major and additional appliances is less than the predetermined value;
- voltage sensor means for generating a voltage signal indicative of the magnitude of the power voltage; and
- means, included in the switch control means, for automatically controlling the switch to automatically disconnect the major appliance from the receiving means when the voltage signal enters a third range of values, indicative of excessively low power voltage, and to automatically reconnect the major appliance to the receiving means after the voltage signal enters a fourth range of values, higher than the third range of values and indicative of normal power voltage.

7. The invention of claim 6 further comprising:
- means for manually adjusting the first and second ranges of values between an upper set, suitable for a higher amperage source of power, and a lower set, suitable for a lower amperage source of power.

8. The invention of claim 7 wherein the upper set is suitable for a 30 amp source of power and the lower set is suitable for a 20 amp source of power.

9. The invention of claim 7 further comprising means for automatically resetting the first and second range of values to the lower set on initial power application to the switch control means.

10. The invention of claim 7 wherein the third range of values is indicative of power voltage less than about 95 VAC and wherein the fourth range of values is indicative of power voltage greater than about 105 VAC.

11. The invention of claim 7 further comprising:
- means, included in the switch control means, for preventing the switch control means from controlling the switch to reconnect the major appliance until a predetermined time has elapsed since the control means has controlled the switch to disconnect the major appliance.

12. A control system for a recreational vehicle comprising means for receiving electrical current from a source of power characterized by a power voltage, a first electrically powered heat transfer appliance controlled by a first manual switch, a second electrically powered heat transfer appliance controlled by a second manual switch, a plurality of additional electrically powered appliances, and means for connecting the first and second heat transfer appliances and the additional appliances to the receiving means, the improvement comprising:

- a first controller switch for selectively disconnecting the first heat transfer appliance from the receiving means;
- a second controller switch for selectively disconnecting the second heat transfer appliance from the receiving means;
- means for remotely sensing when the first manual switch is closed and for generating a first switch closure signal in response thereto;
- means for remotely sensing when the second manual switch is closed and for generating a second switch closure signal in response thereto;
- a controller, responsive to the first and second switch closure signals, and coupled to control the first and second controller switches;
- means, included in the controller, for automatically cycling between closure of the first controller switch and closure of the second controller switch when both the first and second switch closure signals are present, thereby ensuring that the first and second heat transfer appliances are not simultaneously connected to the receiving means;
- means, included in the controller, for automatically closing one of the two controller switches when the corresponding one of the switch closure signals is present and the other of the switch closure signals is absent;
- means for remotely sensing the power voltage and for generating a voltage signal in response thereto; and
- means, included in the controller, for automatically opening the first and second controller switches when the voltage signal falls below a first voltage threshold indicative of excessively low power voltage, and for automatically returning control of the first and second controller switches to the cycling means and the closing means after the voltage signal rises above a second voltage threshold indicative of adequate power voltage.

13. The invention of claim 12 further comprising:
- means for remotely sensing the current drawn by the heat transfer appliances and for generating a first current signal in response thereto; and
- means, included in the cycling means and responsive to the first current signal, for initiating a cycle of the cycling means a selected time after the first current signal reaches a value indicative of current below a predetermined value in the one of the heat transfer appliances associated with the closed one of the controller switches.

14. The invention of claim 13 further comprising:
- means for remotely sensing the current passing between the receiving means and the additional appliances and for generating a current load signal in response thereto; and
- means, included in the controller, for automatically opening the first and second controller switches when the current load signal exceeds a first threshold value indicative of excessive current, and for automatically returning control of the first and second controller switches to the cycling means and the closing means when the current load signal falls below a second threshold value.

15. The invention of claim 14 further comprising:
- means, included in the controller, for ensuring that a predetermined time delay is maintained between the time a selected one of the controller switches is opened and the time it is next closed.

* * * * *

UNITED STATES PATENT AND TRADEMARK OFFICE
CERTIFICATE OF CORRECTION

PATENT NO. : 4,499,385

DATED : February 12, 1985

INVENTOR(S) : William H. Slavik

It is certified that error appears in the above-identified patent and that said Letters Patent is hereby corrected as shown below:

In column 9, line 54, please delete "rest" and substitute therefore --test--;

In claim 1 (column 13, lines 7 and 8), please delete "second" and substitute therefore --sensed--.

Signed and Sealed this

Twenty-sixth Day of August 1986

[SEAL]

Attest:

DONALD J. QUIGG

Attesting Officer

Commissioner of Patents and Trademarks